United States Patent [19]

Muszynski

[11] Patent Number: 4,986,557
[45] Date of Patent: Jan. 22, 1991

[54] MOTORCYCLE STAND

[76] Inventor: Richard S. Muszynski, Torrey St., Easthampton, Mass. 01027

[21] Appl. No.: 363,489

[22] Filed: Jun. 8, 1989

[51] Int. Cl.⁵ .............................................. B62H 1/06
[52] U.S. Cl. ..................................... 280/298; 280/304
[58] Field of Search ............... 280/298, 301, 302, 303, 280/304, 763.1, 293

[56] References Cited

U.S. PATENT DOCUMENTS

| | | | |
|---|---|---|---|
| 420,579 | 2/1890 | Leeper | 280/298 |
| 2,395,148 | 2/1946 | Schwinn | 280/301 |
| 3,642,242 | 2/1972 | Danekas | 280/763.1 |
| 3,712,640 | 1/1973 | Shipman et al. | 280/301 |
| 4,473,239 | 9/1984 | Smart | 280/763.1 |
| 4,817,977 | 4/1989 | Bookbinder | 280/304 |

FOREIGN PATENT DOCUMENTS

| | | | |
|---|---|---|---|
| 417315 | 1/1924 | Fed. Rep. of Germany | 280/298 |
| 606179 | 11/1934 | Fed. Rep. of Germany | 280/298 |
| 1067835 | 2/1954 | France | 280/301 |
| 15374 | 4/1926 | Netherlands | 280/301 |
| 27424 | of 1896 | United Kingdom | 280/298 |

Primary Examiner—Charles A. Marmor
Assistant Examiner—A. M. Boehler
Attorney, Agent, or Firm—Ross, Ross & Flavin

[57] ABSTRACT

A motorcycle stand includes a spring loaded support rod slidably captured within a sleeve pivoted to the cycle frame and having an enlarged pad swingably mounted at the outer free end of the rod for fore and aft and side to side movement thereby accommodating the stand to any type and contour of road surface, with the stand collapsing if the rider accidentally drives off with the stand extended to avoid rider injury and cycle damage.

1 Claim, 1 Drawing Sheet

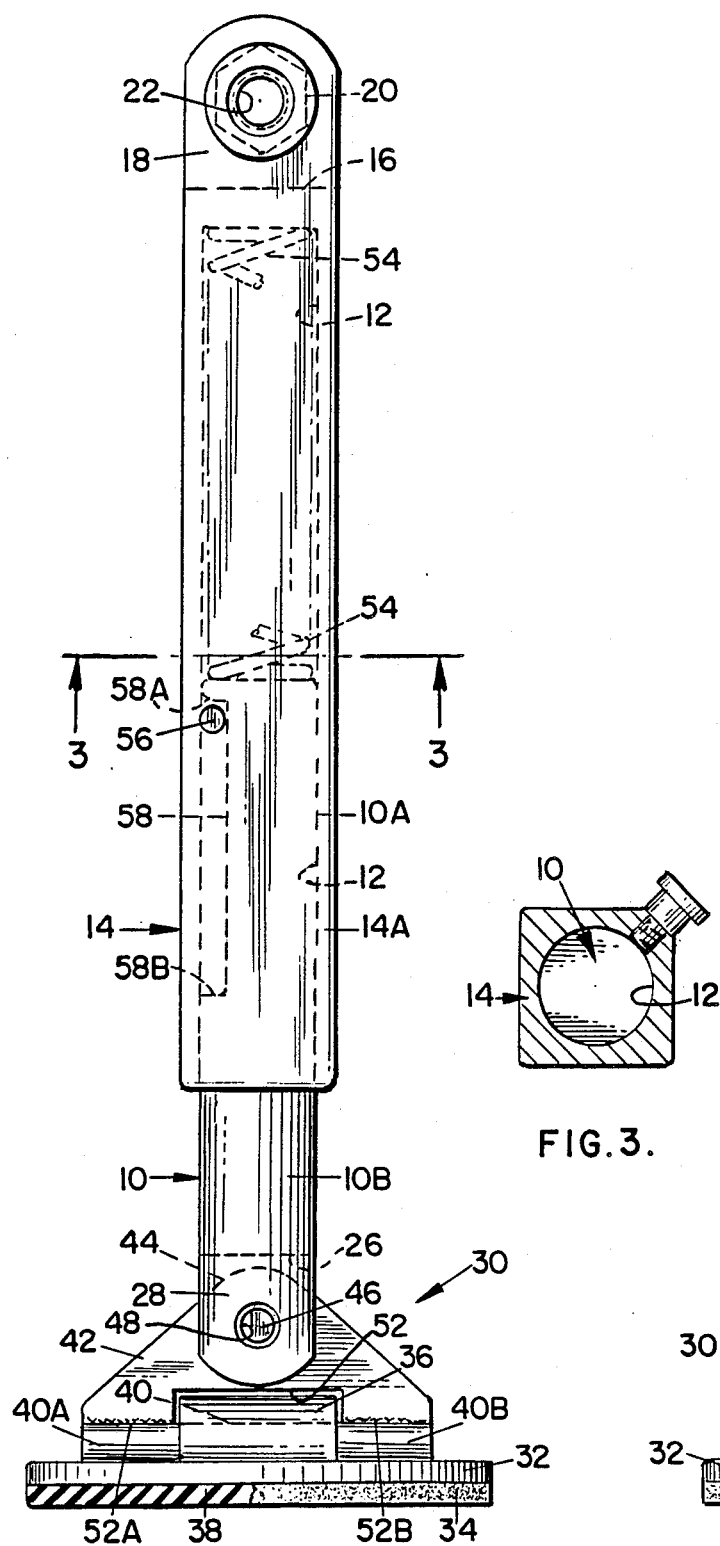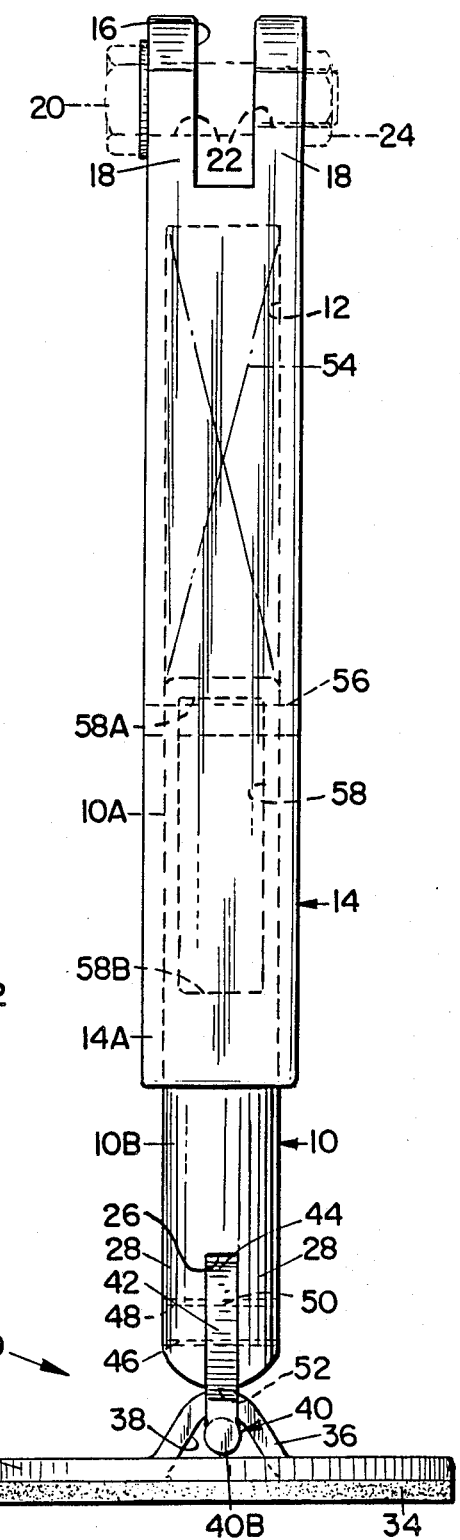

MOTORCYCLE STAND

BACKGROUND OF THE INVENTION

1. Field of the Invention

The invention relates to a motorcycle side or kick stand of the type which is pivoted to the motorcycle frame and movable between storage position, wherein it is disposed closely adjacent the frame when the motorcycle is being driven, and extended or support position, wherein it is angularly disposed relative to the frame and in contact with the ground or roadway for supporting a parked motorcycle.

2. Description of Related Art

Prior art stands consist of a solid metal bar attached to the motorcycle frame with the bar pointed forward at an angle to the vehicle for supporting a parked vehicle. If the rider neglects to move the stand from an extended support position to a stored position adjacent the motorcycle frame before driving off, the solid stand will dig into the road and the cycle and rider will "pitch pole" over the stand. If one is travelling at a fast rate of speed this could be fatal.

With conventional solid stands, if the crown of the road is too high the cycle cannot be parked as it will topple away from the stand.

Also, such stands will not keep the cycle erect on soft sand or a hot/cold asphalt roadway without the use of a plank to prevent the stand from sinking into the roadway.

SUMMARY OF THE INVENTION

With the stand of the invention, if the rider forgets to retract the stand and repeats the same maneuver as above, instead of pitch poling the rider and cycle over the stand when the stand comes in contact with the road, the stand simply collapses and pivots back out of the way for greater safety.

Also, applicant's stand readily conforms to any road contour and provides a firm and secure support even on soft sand or asphalt.

BRIEF DESCRIPTION OF THE DRAWING

FIG. 1 is a front elevational view of a motorcycle stand embodying the invention;

FIG. 2 is a side elevational view; and

FIG. 3 is a cross-sectional view on line 3—3 of FIG. 2.

DESCRIPTION OF THE PREFERRED EMBODIMENT

The motorcycle stand of the invention includes a verticallydisposed cylindrical rod 10 slidably positioned in a central bore 12 of a vertically-oriented sleeve 14 in telescopic manner.

The upper end of sleeve 14 is provided with a centrallylocated, downwardly-extending slot 16 which defines a pair of spaced, upright fingers 18, whereby the sleeve may be mounted to the frame of a motorcycle, not shown, as by a bolt 20 which passes through aligned, provided openings 22 in the fingers 18 and frame and has a nut 24 threaded thereon.

Cylindrical rod 10 includes an upper portion 10A which is disposed in bore 12 and is sleeved by a lower portion 14A of sleeve 14 and a lower portion 10B which extends vertically downwardly and outwardly from sleeve lower portion 14A.

The lower end of rod lower portion 10B is provided with a centrally-located, upwardly-extending slot 26 which defines a pair of spaced depending fingers 28.

A pad assembly 30 is pivotally and swingably related to rod lower portion 10B and includes an enlarged disc 32 having a resilient pad 34 fixed to its lower face.

Disc 32 has an inverted substantially U-shaped bracket 36 fixed to its upper face, the bracket defining a recess 38 which is coincident with the disc longitudinal central axis.

A first pivot pin 40 passes loosely through recess 38 and has opposite free ends 40A and 40B which extend outwardly from the opposite ends of bracket 36.

A flat triangular-shaped tongue 42 extends upwardly from pivot pin 40 and has its apex 44 disposed in slot 26 between fingers 28 of rod lower portion 10B.

A second pivot pin 46 extends through aligned provided openings 48 and 50 in fingers 28 and tongue apex 44 respectively, whereby tongue 42 is swingably suspended from rod 10.

The lower face of tongue 42 is provided with a centrallylocated upwardly-extending slot 52 to accommodate the upper portion of bracket 36 on disc 32.

A forward portion 52A of the lower face of tongue 42 adjacent slot 52 overlies and is fixed to the upper surface of free end 40A of first pivot pin 40.

A rearward portion 52B of the lower face of tongue 42 adjacent slot 52 overlies and is fixed to the upper surface of free end 40B of first pivot pin 40.

Thus, pad assembly 30 is mounted by a universal joint for swingable fore and aft and side to side movement relative to the kickstand axis, permitting the stand to easily accommodate to any road contour, while the large disc provides firm support even on sand.

Rod 10 is spring-loaded by a compression spring 54 disposed in bore 12 of sleeve 14. Spring 54 has an upper end bearing against the closed upper end of bore 12 and a lower end bearing against the upper end of rod upper portion 10A.

Rod 10 is retained within sleeve 14 by a dowel 56 which bridges bore 12 and is fixed at its opposite ends to sleeve 14 at its approximate midsection.

Dowel 56 rides in a vertically-disposed flat 58 which extends inwardly into one side of rod upper portion 10A, the upper end of the flat terminating in an upper wall 58A immediately below the upper end of rod 10, and the lower end of the flat terminating in a lower wall 58B at the approximate midsection of rod 10.

By this arrangement, rod 10 may move vertically relative to sleeve 14, with the limits of such travel being defined upon contact of dowel 56 with the ends of flat 58.

By this structure, if the rider neglects to move the stand from an extended support position to a stored position before driving off, the spring-loaded rod 10 is simply retracted into sleeve 14 and the stand pivoted into a stored position, thereby avoiding serious injury to the rider or damage to the motorcycle.

I claim:

1. In a kick stand system adapted for use in combination with a motorcycle for holding the motorcycle in a substantially upright support position while the motorcycle is non-operational, the combination of:
   a sleeve having a closed upper end and an opened lower end and an inner bore extending from the closed upper end to the open lower end,
   the closed upper end of the sleeve being slotted to define a pair of spaced fingers having axially-aligned through openings for accommodating bolting by which the sleeve may be pivotally mounted relative to the motorcycle for swinging movements between a storage position in close adjacency to the motorcycle and an outrigger position in outward angular disposition with respect to the motorcycle, a slide rod sleeved within the bore for sliding movements with respect to the sleeve and having an outboard extremity extending outwardly of the sleeve, a lower terminal of the slide rod being slotted to define a pair of spaced fingers having axially-aligned through openings, a pad assembly including an enlarged ground engaging disc and a resilient padding on the lower face of the disc and a U-shaped bracket integral with the upper face of the disc, a primary pivot pin extendable within an opening defined between the bracket and the disc and having opposite ends pivotally interrelated with the bracket for facilitating swinging movements of the disc relative to the slide rod, a tongue fixed at its lower end to the primary pivot pin and extendable away therefrom and having an apertured upper end receivable within the slot defined by the fingers of the lower terminal of the slide rod, a second pivot pin extendable through the aligned openings in the fingers of the slide rod and the aperture in the outboard end of the tongue for facilitating the suspension of the tongue from the slide rod in a swinging relationship, the primary and secondary pivot pins being disposed in right angular relationship as to each other for allowing the pivoting of the disc relative to the slide rod in a pair of directions right angular to each other, a stop pin extendable in chord-like manner transversely across the bore and having opposite ends secured to the sleeve, a flat on the slide rod inboard of opposite ends thereof for accommodating the stop pin, the stop pin and flat cooperating as a stop means in limiting the range of sliding movement of the slide rod relative to the sleeve between opposite positions wherein opposite ends of the flat are engaged by the stop pin, a compression spring means disposed in the bore between the closed end of the sleeve and an upper terminus of the slide rod and engageable with the slide rod for retracting the slide rod with respect to the sleeve when the stand is pivoted to its storage position.

* * * * *